United States Patent [19]

Huff

[11] 4,166,049
[45] Aug. 28, 1979

[54] PROCESS OF PRODUCING A RUBBERIZED ASPHALT COMPOSITION SUITABLE FOR USE IN ROAD AND HIGHWAY CONSTRUCTION AND REPAIR AND PRODUCT

[75] Inventor: Bobby J. Huff, Vicksburg, Miss.

[73] Assignee: U.S. Rubber Reclaiming Co., Inc., Miss.

[21] Appl. No.: 718,330

[22] Filed: Aug. 27, 1976

[51] Int. Cl.$^2$ .................. C08L 7/00; C08L 9/00; C08L 11/00; C08L 17/00

[52] U.S. Cl. .................. 260/2.3; 260/3.3; 260/3.5; 260/4 R; 260/5; 260/23 XA; 260/28.5 AS; 260/28.5 A; 260/28.5 B; 260/28.5 D; 260/29.1 R; 260/32.4; 260/33.6 AQ

[58] Field of Search .......... 260/2.3, 28.5 AS, 28.5 A, 260/28.5 B, 28.5 D

[56] References Cited

U.S. PATENT DOCUMENTS

| | | | |
|---|---|---|---|
| 3,644,240 | 2/1972 | Tarbell et al. | 260/4 R |
| 3,930,100 | 12/1975 | McDonald | 260/323 |
| 3,963,659 | 6/1976 | Binder et al. | 260/28.5 AS |
| 4,021,393 | 5/1977 | McDonald | 260/28.5 AS |

OTHER PUBLICATIONS

*Glossary of Terms rel. to Rubber and Rubber-like Subs.*, ASTM Tech. Publication, No. 184.
McDonald, *A New Patching Mat'l for Pavement Failures*, paper presented at 45th Ann. Meet. Hgwy. Res. Bd., Nat'l Acad. Sci., Wash. D.C.
*Proc. Int'l Sym. Use Rubber in Asphalt Pavements*, Salt Lake City, Utah, May 10-13, 1971.
Allison, *Those Amazing Rubber Roads*, Rubber World, Mar. 1967.
*Asphalt-Rubber Stress Absorbing Membranes*-Morris et al., Arizona Dept. of Transportation.
LaGrone et al., *Utilization of Waste Rubber to Improve Highway Performance and Durability*, (U.S. Rubber Reclaiming Co., 1973).
*Highway Research Record*, No. 313, (Hgwy. Res. Bd., Nat'l Res. Council, Nat'l Acad. Sci.-Nat'l Acad. Eng.).
Lewis et al., *Prop. of Petr. Asphalts*, Publ. Roads, vol. 28, No. 4, Oct. 1954.

*Primary Examiner*—Thomas DeBenedictis
*Attorney, Agent, or Firm*—Robert E. Burns; Emmanuel J. Lobato; Bruce L. Adams

[57] ABSTRACT

Process of providing a rubberized asphalt from reclaimed rubber produced from whole scrapped tires and having a composition of about 15-20 percent acetone extractible oils, resins, and other rubber compounding ingredients such as antioxidants, antiozants, emulsifiers, and the like, about 10-35 percent carbon black, about 10-20 percent ash primarily from zinc oxide, titanium dioxide, clay, whiting, and talc, and about 35-45 percent rubber hydrocarbon of which 15-30 percent is a mixture of synthetic rubbers such as SBR, neoprene, polybutadiene, isoprene, butyl, and chlorobutyl, and other 10-20 percent is natural rubber and an asphalt at a level of 5-25 percent rubber to 75-95 percent asphalt by weight, the asphalt having a composition of 20-30 percent asphaltenes, 5-15 percent nitrogen bases, 10-20 percent first acidaffins, 30-40 percent second acidaffins, and 10-20 percent paraffins, and the rubber and asphalt being cooked at about 350-450 degrees F. for 30 minutes to 2 hours, which improves the adhesion of the asphalt, reduces stripping, and improves the strength and flexibility of the asphalt; and the product so formed.

Asphalts having less than 30 percent second acidaffins content do not produce the desired adhesive properties when combined with rubber and those that contain more than 40 percent of this component become soft and sticky at summer pavement temperature.

Also a process for producing a rubberized asphalt product suitable for joint and crack sealing, membrance, chip seals, and as a binder for asphaltic concrete, and having a viscosity of less than 800 centipoises at 400° F. and being sprayable using conventional equipment may be provided as may the product itself. It may be provided by cooking at 350°-450° F. for 30 minutes to 2 hours, a composition containing 20-60 percent reclaimed ("devulcanized") rubber, 15-20 percent high rubber scrap, 15-50 percent of a scrap rubber crumb having a somewhat lower rubber content, and an asphalt composed of 20-30 percent asphaltenes, 5-15 percent nitrogen basis, 10-20% first acidaffins, 30-40% second acidaffins, and 10-20 percent paraffins; the rubber-asphalt proportion being 5-25 percent rubber to 75-95 percent asphalt by weight.

11 Claims, No Drawings

PROCESS OF PRODUCING A RUBBERIZED ASPHALT COMPOSITION SUITABLE FOR USE IN ROAD AND HIGHWAY CONSTRUCTION AND REPAIR AND PRODUCT

FIELD OF THE INVENTION

This invention relates to a process for producing an elastomeric asphaltic sealer and binder having exceptional adhesive and cohesive properties and being extremely flexible and elastic at low temperatures yet very stable and resistant to bleeding at high temperatures.

DESCRIPTION OF THE PRIOR ART

For more than a century now a continuous stream of recommendations have been forthcoming concerning methods for using rubber to improve asphalts used in highway construction and maintenance. The literature on adding rubber to asphalt for the purpose of producing an improved binder is indeed voluminous, and a wealth of information has been made available to the general public thru publications that have appeared in Rubber Trade Journals, Road Building Journals, and papers presented at technical meetings such as those of the Transportation Research Board and the International Symposium on Rubber in Roads that was held in Salt Lake City, Utah on May 10–12, 1971.

A historic review of early work performed in this field was presented in a paper by Kenneth Allison in the trade journal Rubber World (New York, March and April 1967) under the title "Those Amazing Rubber Roads". An extensive study of the effects of rubber added to asphalt was also published by Lewis and Welborn in Public Roads volume 28, pages 64–89 (Oct. 1954).

Mr. Charles H. McDonald presented information on elastomeric pavement compositions in a paper published in Highway Research Record, number 146 of the Highway Research Board, December 1966, Washington D.C. pages 1–16, and a paper presented at the International Symposium on the use of rubber in asphalt pavements in Salt Lake City, Utah, May 10–12, entitled "An Elastomer Solution for Alligator Pattern, or Fatigue Cracking in Asphalt Pavements".

U.S. Pat. Nos. 3,891,585, 3,919,148, 3,930,100, 3,844,668, 3,338,849, 3,577,250, 3,769,246 and 2,857,357 all deal with various aspects of utilizing rubber in asphalts for road construction or maintenance.

Additional papers that have been presented at Transportation Research Board meetings which describe various methods for utilizing rubber in asphalt are as follows: Gene R. Morris and Charles H. McDonald, "Asphalt-Rubber Membranes, Development, Use, Potential", January 1976. B. D. LaGrone and B. J. Huff, "Utilization of Waste Rubber to Improve Highway Performance and Durability", January 1973. Michel I. Darter, Dale E. Peterson, George M. Jones and Roland Vokac, "Design, Construction, and Initial Evacuation of Experimental Test Sections of Asphalt Containing Synthetic Rubber, January 1970. J. E. Fitzgerald and James S. Lai, "Initial Evaluation of the Effect of Synthetic Rubber Additives on the Thermorheological Properties of Asphalt Mixtures," January 1970.

A review of the literature cited above as well as other data on the use of rubber to improve asphalt binders and sealers, will reveal that all of the processes suggested have some economic or technological limitations that have resulted in either a limited adoption in actual practice or their total rejection by highway construction and maintenance engineers.

The main reason for rejection of many of the proposals that have been made for utilizing rubber in asphalts has been erratic performance of the products that has resulted from the attempt to use an indefinite rubber composition in a very variable asphalt of inexact composition.

There has been a tendency to use the generic term "asphalt" as if it were an exact chemical composition, while it is in fact applied to a class of hydrocarbon materials that can have widely divergent properties. The same is true for "rubber" which is also a generic term that can describe elastomeric materials having a very wide range of properties that can range from those of a battery box or bowling ball to those of a gum latex.

It has long been known that solubility or degradation (or "jelling" as Mr. McDonald calls it) or rubber in an asphalt is a time-temperature phenomenon.

Attempts have been made, as was done by Johnson in U.S. Pat. No. 3,338,849 and Rostler in U.S. Pat. No. 3,577,250 to improve the "dispersion" or incorporation of "rubber" into an "asphalt". McDonald in U.S. Pat. No. 3,891,585 also describes a method for incorporating rubber into an asphalt. However, these methods, like all the others appearing in the literature have limitations of one type or the other. The polyethylene and gilsonite added to the reclaimed rubber in the Johnson mixture tended to dilute the elastic properties imparted by the rubber, and also reduced adhesive properties.

The product described by Rostler was intended to enhance the solubility of the rubber by combining the rubber with the malthenes fraction of the asphalt and applying this mixture to asphalt pavement to rubberize the asphalt in situ. The malthenes fraction is a mixture of several components all of which do not necessarily contribute anything to the solubility, and the presence of these unnecessary components has produced excessive softening of the pavement resulting in lowered skid resistance.

The Rostler procedure was also directed to the utilization of latex-type rubber which lacked the resilience and temperature stability of other types of polymers. It is also questionable as to whether this procedure effectively rubberized the asphalt, because the low porosity of the pavement limited the contact of the asphalt with the rubber.

The McDonald product and his process for applying the product often requires the use of a solvent to reduce the viscosity of the rubber-asphalt composition to a sprayable level, which is extremely hazardous and requires a long set time which can, therefore, delay traffic on a road construction project, and also lacks the best adhesive properties.

In one U.S. Pat. No. (3,891,585), McDonald proposes to indiscriminately react 25–33% of any non-oil resistant rubber with practically any asphalt to produce a pavement repair material. For most of these mixtures a very viscous mass is formed making the application of the material impractical with conventional paving equipment.

SUMMARY OF THE INVENTION

This invention involves selecting the proper rubber compounds and an asphalt base having the proper composition, and mixing and cooking the two together to form a rubberized asphalt having improved adhesion, cohesion, and temperature susceptibility properties, and controlling the combinations of materials, cooking time and temperatures to produce a product that can be sprayed to produce a chip seal binder, strain absorbing membrane, or the like using conventional equipment and not requiring a cut back or emulsifying step prior to application.

We have found that devulcanized reclaimed rubber produced from whole scrapped tires and having a composition of about 15-20% acetone extractible oils, resins, and other rubber compounding ingredients such as antioxidants, antiozonants, emulsifiers, and the like, about 10-35% carbon black, about 10-20% ash primarily from zinc oxide, titanium dioxide, clay, whiting, and talc, and about 35-45% rubber hydrocarbon of which 15-30% is a mixture of synthetic rubbers such as SBR, neoprene, polybutadiene, isoprene, butyl, and chlorobutyl, and the other 10-20% is natural rubber when mixed at a level of 5-25% rubber to 75-95% asphalt by weight with an asphalt having a composition of 20-30% asphaltenes, 5-15% nitrogen bases, 10-20% first acidaffins, 30-40% second acidaffins, and 10-20% paraffins, and cooked at about 350-450 degress F. for 30 minutes to 2 hours, improves the adhesion of the asphalt, reduces stripping, and improves the strength and flexibility of the asphalt. By devulcanization is meant a substantial regeneration of the rubber compound to its original plastic state, thus permitting the product to be processed, compounded and vulcanized. However combined sulfur is not affected. The term "devulcanized reclaimed rubber" is used to distinguish such material from what is sometimes called "reclaimed rubber" but is merely ground-up vulcanized rubber scrap that has not been devulcanized. Asphalts having less than 30% second acidaffins content do not produce the necessary adhesive properties when combined with rubber and those that contain more than 40% of this component become soft and sticky at summer pavement temperature. We have also discovered that when vulcanized rubber crumb, having a high natural rubber content and composed of about 5-10% acetone extractibles, 25-30% carbon black, 0-10% ash, and 55-65% rubber hydrocarbon of which 80-100% is a natural rubber and only 0-20% is synthetics when added to an asphalt containing from 20-30% asphaltenes, 5-15% nitrogen bases, 10-20% first acidaffins, 30-40% second acidaffins, and 10-20% paraffins at a level of 5-25% rubber to 75-95% asphalt by weight and is subjected to cooking at 350-450 degrees for 30 minutes to 2 hours, produces a rubberized asphalt that has exceptional tackiness, elasticity, and flexibility at low temperatures which makes the product especially suitable for strain absorbing chip sealing membranes, waterproofing membranes, and the like.

We have also discovered that the addition of a scrap rubber crumb having a slightly lower natural rubber content as can be obtained from truck tires, the undertread of truck tires (#3 truck peels), or possibly some radial tires of a similar composition when added to an asphalt having a composition of from 20-30% asphaltenes, 5-15% nitrogen bases, 10-20% first acidaffins, 30-40% second acidaffins and 10-20% paraffins and cooked at 350 degrees F. for 30 minutes to 2 hours will be less soluble than either the high natural rubber crumb, or the devulcanized rubber and will add a degree of toughness to the rubberized asphalt that cannot be obtained with either of the other materials.

In a certain of the aspects of the invention we have found that a very unique rubberized asphalt product suitable for joint and crack sealing, membranes, chip seals, and as a binder for asphaltic concrete can be produced by using a combination of about 20-60% devulcanized reclaimed rubber, 15-50% high natural rubber scrap, 15-50% of a scrap rubber crumb having a somewhat lower natural rubber content and mixing these with an asphalt composed of 20-30% asphaltenes, 5-15% nitrogen bases, 10-20% first acidaffins, 30-40% second acidaffins, and 10-20% paraffins at a level of 5-25% rubber to 75-95% asphalt by weight and cooking the whole of the mix in combination for a sufficient time to produce a rubberized asphalt having a viscosity of less than 800 centipoises at 400 degrees F. and being sprayable using conventional equipment.

For a sealcoat binder, and sealers we have found that the proper formulation of rubber in asphalt can produce the desired properties of excellent adhesion to the stone, improved resistance to softening at summer temperatures and flexibility at low temperatures.

For interlayer membrances where stone adhesion and high temperature properties are not as critical, the formula can be made extremely flexible to absorb the strains of pavement movement thus reducing reflection cracking of an asphalt concrete overlay. In binders for asphalt concrete where cohesive properties are more critical than the adhesive properties and where extreme flexibility is not desired, the rubberized asphalt can be designed by proper selection of the rubber type and asphalt to provide a very tough material that will have improved resistance to cracking, rutting, shoving or bleeding.

From a laboratory viewpoint, the ideal material would have a softening point above any surface temperature found on highways (probably 160 degrees F.) a penetration of 0, and a brittle point below any temperature found on highways (probably −40 degrees F.) with good adhesion and flexibility. It is realized that even with rubberized asphalt all these ideals are not achievable but by choosing the proper rubber and asphalt composition we can approach these ideals and produce the best compromise for a given application.

Very hard asphalts can be used without rubber treatment to achieve the desired high temperature properties of high softening point and low penetration, but these materials are very brittle at lower temperatures and form a very poor bond to the stone. By the addition of rubber of the proper composition to this type asphalt, the high temperature properties can be essentially retained with improvements in the adhesion to the stone and flexibility at low temperatures.

To avoid the flexibility and adhesion problems of the harder asphalts, softer asphalts are often used to improve these properties, but they become soft in hot weather producing bleeding and rutting of the pavement. They too become very glassy at very low temperatures producing only limited improvement in flexibility. With these asphalts, rubber can be added to improve the flexibility and increase the viscosity to reduce hot weather problems.

DETAILED DESCRIPTION OF THE INVENTION

EXAMPLE 1

A rubberized asphalt was prepared by heating one part devulcanized reclaimed rubber as described above and 4 parts by weight of an asphalt containing 26% asphaltenes, 8% nitrogen bases, 16% first acidaffins, 36% second acidaffins, and 14% paraffins at 425 degrees F. for one hour. The resulting material was sprayed on a cracked pavement at a rate of 0.4 gallons per square yard and covered with a ⅜ inch limestone seal coat aggregate. Bond to the aggregate was good and after two years no cracking has recurred indicating the effectiveness of the rubber when combined with an asphalt containing the proper second acidaffins content. Laboratory tests on the field prepared rubberized asphalt produced the following results:

|  | Rubberized | Untreated Asphalt |
| --- | --- | --- |
| Softening Point | 118 | 108 |
| Penetration | 110 | 278 |
| Cold Bond | Passed 5 cycles | Failed in one cycle (Brittle) |
| Brittle Point | −34° F. | 0° F. |

The cold bond and brittle point tests illustrate the excellent adhesion and flexibility of this material. The softening point is somewhat low and the penetration high but the placement is in an area where the heat is not extreme and these factors are not critical.

TEST WITH REDUCED SECOND ACIDAFFIN

Example 1A

A rubberized asphalt was prepared by heating one part devulcanized reclaimed rubber as described above and 4 parts by weight of an asphalt containing 28% asphaltenes, 12% nitrogen bases, 26% first acidaffins, 23% second acidaffins and 11% paraffins at 425 degrees F. for one hour. The resulting material was sprayed on a cracked pavement at a rate of 0.3 gallon per square yard and covered with a ⅜ inch micaceous seal coat aggregate. Bond to the stone was poor due to the low second acidaffins content of the asphalt and most of the aggregate was whipped off by traffic. The membrane was covered with an overlay of asphaltic concrete and after two years practically none of the original cracking has come through the asphalt concrete.

Laboratory tests on the field prepared rubberized asphalt produced the following results:

|  | Rubberized | Untreated Asphalt |
| --- | --- | --- |
| Softening Point | 124 | 110 |
| Penetration at 77° F. | 90 | 124 |
| Cold Bond | Adhesive failure in one cycle | Adhesive failure in one cycle |
| Brittle Point | −10° F. | 10° F. |

The cold bond test confirms the lack of adhesion which made this material unsuitable as a chip seal binder, however, the low brittle point indicates its flexibility and consequent ability to prevent cracking as an interlayer. The low softening point and high penetration were not critical because this material was not exposed the direct heat of the sun.

TEST WITH INCREASED SECOND ACIDAFFIN

Example 1B

A rubberized asphalt was prepared by heating for one hour at 400 degrees F. a mixture of 1 part devulcanized reclaimed rubber as described above and 4 parts by weight of an asphalt containing 20% asphaltenes, 4% nitrogen bases, 8% first acidaffins, 54% second acidaffins, and 14% paraffins. The resulting material was sprayed on a cracked pavement at a rate of 0.4 gallons per square yard and covered with a ⅜ inch expanded clay seal coat aggregate. This binder effectively prevented cracking but, due to the high second acidaffins content of the asphalt, the material became very soft and sticky at summer temperatures producing a slick pavement that is easily damaged by traffic. Laboratory tests on the field prepared rubberized asphalt produced the following results:

|  | Rubberized | Untreated Asphalt |
| --- | --- | --- |
| Softening Point | 112 | 106 |
| Penetration | 150 | 160 |
| Cold Bond | Passed 5 cycles | Failed in one cycle (Brittle) |
| Brittle Point | −22° F. | 10° F. |

The cold bond and brittle point tests illustrate the flexibility which made this material perform well in preventing cracking but, the high penetration and low softening point indicate its sensitivity to summer temperatures.

Example 2

A rubberized asphalt was prepared by heating one part devulcanized rubber as described above, one part vulcanized rubber crumb containing approximately 50% rubber hydrocarbon derived from natural rubber, and 8 parts by weight asphalt containing 24% asphaltenes, 10% nitrogen bases, 19% first acidaffins, 35% second acidaffins, and 12% paraffins at 400 degrees F. for one hour. The resulting material was sprayed onto a badly cracked pavement in a desert area at rates from 0.4 to 2.0 gallons per square yard and covered with a ⅜ inch crushed granite sealcoat aggregate. After one year this material has resisted cracking and has not produced any undesirable softening at high summer temperatures. Laboratory tests on the field prepared sealer produced the following results:

|  | Rubberized | Untreated Asphalt |
| --- | --- | --- |
| Softening Point | 138 | 127 |
| Penetration | 71 | 21 |
| Cold Bond at 0 degree F. | Failed in one cycle (Brittle) | Failed in one cycle (Brittle) |
| Brittle Point | 20° F. | 40° F. |

The high softening point and low penetration indicate the excellent hot weather properties of the material. Although the brittle point was higher than that obtained with other rubberized asphalts it is substantially lower than that of untreated asphalts with similar high temperature properties indicating improvement in flexibility. The cold bond test temperature is below the brittle point of the material but does indicate good adhesion.

Example 3

A rubberized asphalt was prepared by heating for one hour at 400 degrees F. a mixture of one part devulcanized rubber as described above, one part vulcanized rubber crumb containing approximately 50% rubber hydrocarbon derived from natural rubber, and 8 parts by weight of an asphalt containing 19% asphaltenes, 6% nitrogen bases, 12% first acidaffins, 50% second acidaffins, and 14% paraffins. The resulting material was sprayed onto a badly cracked pavement at a rate of 0.5 gallons per square yard and covered with a ⅜ inch sealcoat aggregate. After one year this material has prevented cracking but has become very soft and sticky producing a slick pavement that is easily damaged by traffic. This is typical of the results obtained when rubber is combined with an asphalt having a second acidaffins content of greater than 40%. Laboratory tests on the field prepared sealer produced the following results:

|  | Rubberized | Untreated Asphalt |
| --- | --- | --- |
| Softening Point | 111 | 106 |
| Penetration | 115 | 128 |
| Cold bond at 0 degree F. | Passed 5 cycles | Failed on one cycle |
| Brittle Point | 0° F. | 10° F. |

The cold bond and brittle point tests indicate the excellent flexibility and adhesion of this material while the low softening point and high penetration indicate the tendency to be too soft at summer temperatures.

Example 4

A rubberized asphalt was prepared in the laboratory by heating for one hour at 400 degrees F. a mixture of two parts devulcanized reclaimed rubber as described above, one part vulcanized rubber crumb containing approximately 50% rubber hydrocarbon derived from natural rubber, one part vulcanized rubber crumb from tire parts containing approximately 35% rubber hydrocarbon derived from natural rubber and 15% rubber hydrocarbon derived from synthetic rubber, and 16 parts of an asphalt containing 24% asphaltenes, 10% nitrogen bases, 19% first acidaffins, 35% second acidaffins and 12% paraffins. Tests on this material produced the following results:

|  | Rubberized | Untreated Asphalt |
| --- | --- | --- |
| Softening Point | 153 | 122 |
| Penetration | 64 | 92 |
| Cold Bond at 0 degree F. | Passed 5 cycles | Failed on one cycle (Brittle) |
| Brittle point | −40° F. | 0° F. |

It can be seen from this data that this material would have excellent resistance to high temperatures and would be flexible under extreme cold.

Example 5

A rubberized asphalt was prepared by heating for 90 minutes at 400 degrees F. a mixture of one part devulcanized reclaimed rubber as described above and 4 parts asphalt containing 28% asphaltenes, 11% nitrogen bases, 18% first acidaffins, 32% second acidaffins and 11% paraffins. The material thus produced was used as a binder in asphaltic concrete and placed over a pavement prone to cracking. After three years in place, this pavement is essentially crack-free and has resisted the problems of summer temperatures such as rutting and bleeding. These field results are indicated by the following laboratory tests on the rubberized asphalt:

|  | Rubberized | Untreated Asphalt |
| --- | --- | --- |
| Softening Point | 158 | 128 |
| Penetration | 51 | 94 |
| Cold Bond | Failed in adhesion on one cycle | Failed in adhesion on one cycle |
| Brittle Point | −10° F. | 20° F. |

The softening point and penetration indicate excellent high temperature properties. Since high adhesion is not required for this type application, this property was lowered to increase the other properties. As can be seen from the brittle point, good flexibility was retained.

Tests on the asphalt concrete indicate that the rubberized asphalt increased the strength 20% over conventional mixes.

|  | Rubberized | Untreated Asphalt |
| --- | --- | --- |
| Marshall Stability | 2090 | 1780 |

I claim as my invention:

1. A process for producing a rubberized asphalt for highway construction and maintenance comprising reacting together for from thirty minutes to two hours at 350°–450° F. 75–95% by weight of asphalt and 5–25% by weight of rubber, wherein said asphalt has a composition of 20–30% asphaltenes, 5–15% nitrogen bases, 10–20% first acidaffins, 30–40% second acidaffins and 10–20% paraffins, and wherein the rubber is devulcanized reclaimed rubber produced from whole scrapped tires and having a composition of about 15–20% rubber compounding ingredients comprising acetone extractible oils, resins, and others, about 10–35% carbon black, 10–20% ash and about 35–45% rubber hydrocarbon of which 30–85% is at least one member of the group consisting of SBR, neoprene, polybutadiene, poly-isoprene, and butyl and chlorobutyl rubber, and of which 15–70% is natural rubber.

2. A process for producing a rubberized asphalt for highway construction and maintenance comprising reacting together for from thirty minutes to two hours at 350–450° F. 75–95% by weight of asphalt 5–25% by weight of rubber, wherein said asphalt has a composition of 20–30% asphaltenes, 5–15% nitrogen bases, 10–20% first acidaffins, 30–40% second acidaffins and 10–20% paraffins, and wherein the rubber is a blend of 50–75 parts by weight of devulcanized rubber of a composition of about 15–20% rubber compounding ingredients, about 10–35% carbon black, about 10–20% ash, and about 35–45% rubber hydrocarbon of which 30–85% consists of synthetic tire rubbers and about 15–70% is natural rubber; and 25–50 parts by weight of vulcanized scrap rubber crumb.

3. A process according to claim 2, wherein at least 50% of the rubber hydrocarbon content of said vulcanized scrap rubber crumb is natural rubber.

4. A process according to claim 3, wherein the rubber hydrocarbon content of said vulcanized rubber crumb consists of 80–100% natural rubber and 0–20% synthetic rubber.

5. A rubberized asphalt suitable for use in highway construction and repair as a joint and crack sealer, chip sealer binder, membrane interlayer, or binder for asphaltic concrete and which has exceptional adhesive and cohesive properties and is extremely flexible and elastic at low temperatures yet very stable and resistant to bleeding at high temperatures and is prepared by reacting together for from 30 minutes to two hours at 350–450 degrees F., 75-95% by weight of an asphalt having a composition of 20-30% asphaltenes, 5-15% nitrogen bases, 10-20% first acidaffins, 30-40% second acidaffins and 10-20% paraffins, and 5-25% by weight of scrap rubber to produce a material having a viscosity of less than 800 centipoises at 400° F. so that it can be sprayed with conventional asphalt distributing equipment.

6. A material as in claim 5 wherein said rubber is devulcanized reclaimed rubber produced from whole scrapped tires and having a composition of about 15-20% rubber compounding ingredients comprising acetone extractible oils, resins, and others, about 10-35% carbon black, 10-20% ash and about 35-45% rubber hydrocarbon of which 30-85% is at least one member of the group of synthetic rubbers consisting of SBR, neoprene, polybutadiene, poly-isoprene, and butyl and chlorobutyl rubber, and of which 15-70% is natural rubber.

7. A material as in claim 4 wherein said rubber is a blend of 50-75 parts by weight of devulcanized rubber of a composition of about 15-20 % rubber compounding ingredients comprising acetone extractible oils, resins, and others, about 10-35% carbon black, 10-20% ash primarily from zinc oxide, titanium dioxide, clay, whiting, and talc, and about 35-45% rubber hydrocarbon of which 30-85% is at least one member of the group consisting of SBR, neoprene, polybutadiene, polyisoprene, and butyl and chlorobutyl rubber, and of which 15-70% is natural rubber; and 25-50 parts by weight of vulcanized rubber having the high natural rubber content specified below comprising about 5-10% acetone extractibles, 25-30% carbon black, 0-10% ash, and 55-65% rubber hydrocarbon of which 80-100% is natural rubber and only 0-20% is synthetic rubber.

8. A material as in claim 4 wherein said rubber is a blend of 20-60 parts by weight of devulcanized rubber having a composition of about 15-20 parts of rubber compounding ingredients comprising acetone extractible oils, resins, and others, about 10-35% carbon black, 10-20% ash and about 35-45% rubber hydrocarbon of which 30-85% is at least one member of the group consisting of SBR, neoprene, polybutadiene, polyisoprene, and butyl and chlorobutyl rubber and of which 15-70% is natural rubber, 20-40 parts by weight of vulcanized rubber crumb comprising 25-50 parts by weight of vulcanized rubber having the high natural rubber content specified below and comprising about 5-10% acetone extractibles, 25-30% carbon black, 0-10% ash, and 55-65% rubber hydrocarbon of which 80-100% is natural rubber and only 0-20% is synthetic rubber, and 20-50 by weight of vulcanized rubber crumb derived from tire parts with a chemical composition of about 15-20% acetone extractibles, 25-35% carbon black, 0-10% ash, and 45-55% rubber hydrocarbon of which 55-90% is natural rubber and 10-45% is synthetic rubber.

9. A process for producing a rubberized asphalt for highway construction and maintenance comprising reacting together for from thirty minutes to two hours at 350°–450° F. 75-95% by weight of asphalt and 5-25% by weight of rubber, wherein said asphalt has a composition of 20-30% asphaltenes, 5-15% nitrogen bases, 10-20% first acidaffins, 30-40% second acidaffins and 10-20% paraffins, and wherein said rubber consists essentially of vulcanized scrap rubber crumb.

10. A process according to claim 9, wherein at least 50% of the rubber hydrocarbon content of said vulcanized scrap rubber crumb is natural rubber.

11. A process according to claim 10, wherein said vulcanized rubber crumb is composed of about 5-10% acetone extractibles, 25-30% carbon black, 0-10% ash and 55-65% rubber hydrocarbon of which 80-100% is a natural rubber and 0-20% is synthetic rubber.

* * * * *